United States Patent
Fritsche et al.

(10) Patent No.: US 6,735,582 B2
(45) Date of Patent: May 11, 2004

(54) PRE-LOAD CURSOR IN A DATABASE METHOD AND SYSTEM

(75) Inventors: Kirk Fritsche, Cedar Park, TX (US); Mark David Nielsen, Houston, TX (US); Patrick Edward Nogay, Austin, TX (US); Michael Albert Perks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 09/738,238

(22) Filed: Dec. 15, 2000

(65) Prior Publication Data

US 2002/0078031 A1 Jun. 20, 2002

(51) Int. Cl.⁷ ............................................. G06F 17/30
(52) U.S. Cl. ................................................ 707/1; 707/3
(58) Field of Search .............................. 707/1, 3, 7, 10, 707/203

(56) References Cited

U.S. PATENT DOCUMENTS

| | | | |
|---|---|---|---|
| 5,201,046 A | * 4/1993 | Goldberg et al. | 707/100 |
| 5,398,338 A | * 3/1995 | Yoshida | 707/7 |
| 5,553,218 A | * 9/1996 | Li et al. | 707/102 |
| 5,666,442 A | * 9/1997 | Wheeler | 382/209 |
| 5,675,329 A | 10/1997 | Barker et al. | 341/22 |
| 5,819,251 A | * 10/1998 | Kremer et al. | 707/10 |
| 5,874,963 A | 2/1999 | Johnson et al. | 345/348 |
| 5,926,807 A | * 7/1999 | Peltonen et al. | 707/3 |
| 5,974,416 A | * 10/1999 | Anand et al. | 707/10 |
| 5,995,026 A | 11/1999 | Sellers | 341/34 |
| 6,014,139 A | 1/2000 | Watson et al. | 345/339 |
| 6,044,216 A | 3/2000 | Bhargava et al. | 395/701 |
| 6,128,610 A | * 10/2000 | Srinivasan et al. | 707/2 |
| 6,397,219 B2 | * 5/2002 | Mills | 707/10 |
| 6,460,052 B1 | * 10/2002 | Thomas et al. | 707/203 |

* cited by examiner

Primary Examiner—Safet Metjahic
Assistant Examiner—Cam-Linh Nguyen
(74) Attorney, Agent, or Firm—Duke W. Yee; David A. Mims, Jr.; Stephen J. Walder, Jr.

(57) ABSTRACT

A method and system are described in a data processing system including a database for efficiently retrieving copies of data rows from the database. Query criteria is received by a server from a client which specifies search criteria describing data rows and which requests a particular number of the data rows to return. Each of the data rows is associated with a unique primary key which uniquely identifies a particular data object. The primary key for each of the data rows meeting the specified criteria is first retrieved from the database by the server. Thereafter, copies of only the particular number of the data rows are retrieved from the database using the primary keys. Copies of only the particular number of data rows are then returned to the requesting client.

14 Claims, 4 Drawing Sheets

PRE-LOAD CURSOR IN A DATABASE METHOD AND SYSTEM

BACKGROUND OF THE INVENTION

1. Technical Field

The present invention relates in general to data processing systems, and more particularly to data processing systems including a database management system. Still more particularly, the present invention provides apparatus and methods in a database management system including a pre-load cursor for returning primary keys for rows meeting search criteria to improve database searching efficiency.

2. Description of Related Art

Nearly all high-level programming languages support various constructs, such as constants, variables, composite types, collection types, etc. for manipulating data. For some applications, particularly data management systems, these constructs have proved to be insufficient. The DBMS manages all requests for database action, such as queries or updates, from the user. In addition, a DBMS permits centralized control of security and data integrity requirements.

Many data processing systems take advantage of distributed processing by using a client/server architecture. In this architecture, the database is divided into two parts: a front-end or a client portion, and a back-end or a server portion. The client portion concentrates on requesting, processing, and presenting data managed by the server portion. The server portion runs server software and handles the functions required for concurrent, shared data access. Of course, the client-server architecture can be distributed across a network. For example, each of the client applications may be executed at a different node of the network, while one or more other nodes on the network are used for storing the database and executing the server software to process database requests sent by users at the client nodes.

To request data from a database, a client application may have a query written in any number of programming languages. One such language is the industry standard Structured Query Language (SQL) defined by the International Standards Organization (ISO). In response to executing the client application, the client will cause the server portion to perform the required operations on the information in the database.

As a result of the insufficiencies of general-purpose high level programming data constructs, special-purpose constructs referred to herein as "cursors" are supported by various database languages. A cursor is a handle, i.e. a name or pointer, to the set of rows produced in response to executing a specific query statement. The term "cursor" is a generic term which may mean one of several different types of pointers.

Two different prior art server implementations are described below. Each server implementation describes a different cursor method for locating and returning data to a requesting client.

The first implementation is a stateless application server and is illustrated by the block diagram of FIG. 1. In this implementation, a client is coupled to an application server which is coupled to a database. The client first initiates a session with the server and transmits query criteria to the application server requesting a particular number of data rows which meet the query criteria. When the application server receives the query criteria, the application server will create a cursor and initiate a session with the database. The cursor then queries the database to obtain a result set which includes copies of all of the rows which meet the search criteria even though only a smaller number was requested. The application server's session with the database is ended after copies of all of the rows are retrieved. The cursor in the application server then returns the copies of all of the rows to the client. After the client receives copies of all of the rows, it ends its session with the server.

The client may then initiate another session with the server and transmit a query for a second number of data rows meeting the same criteria. In this case, the process described above is repeated. The server initiates a new session with the database, and a new cursor is created which then searches the database again for the same rows. All of the rows are again retrieved from the database and returned to the client.

This implementation suffers from several disadvantages. The client requested only a particular number of rows, but the cursor retrieved and returned all rows meeting the criteria. Returning all rows takes a longer time and more bandwidth than returning only a limited number of rows. Further, the server may need to search the database multiple times for the same data.

The second implementation is a stateful application server and is illustrated by the block diagram of FIG. 2. In this implementation, a client is also coupled to an application server which is coupled to a database. The client again initiates a session with the server and transmits query criteria to the application server requesting a particular number of data rows which meet the query criteria. When the application server receives the query criteria, a cursor is created and a session between the server and the database is initiated. The cursor queries the database to obtain a result set which includes copies of all of the rows which meet the search criteria. The cursor in the application server then returns only copies of the requested number of data rows from the result set to the client. The client may subsequently request a second number of copies of these same data rows. In this case, the cursor will return copies of the requested number of data rows using the result set obtained from its first search of the database without having to search the database again.

The application server's session with the database remains open until the client closes its session with the server. Therefore, if the client continues to transmit queries for a number of the rows meeting the same criteria, the session the application server initiated with the database remains open.

This implementation suffers from several disadvantages. The application server has exclusive use of a database connection until the client closes its session with the application server. This ties up the database resource unnecessarily. Once the server obtained its result set, it did not need to access the database further to respond to subsequent queries for data meeting the criteria specified in the first query. Other clients are prohibited from using that database connection while the database is tied up with this client even though the application server has already received the results it requested.

Therefore, a need exists for a method and system including a database for a pre-load cursor whereby database connections are available in between client requests for data rows, and whereby only the number of requested rows are returned.

SUMMARY OF THE INVENTION

A method and system are described in a data processing system including a database for efficiently retrieving copies of data rows from the database. Query criteria are received by a server from a client which specifies search criteria describing data rows and which requests a particular number of the data rows to return. Each of the data rows is associated with a unique primary key which uniquely identifies a particular data row. The primary key for each of the data rows meeting the specified criteria is first retrieved from the database by the server. Thereafter, copies of only the particular number of the data rows are retrieved from the database using the primary keys. Copies of only the particular number of data rows are then returned to the requesting client.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to FIGS. 1–7 of the drawings, like numerals being used for like and corresponding parts of the accompanying drawings.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running alternate operating systems such as Solaris, without departing from the spirit and scope of the invention.

The present invention is a method and system for efficiently retrieving copies of data rows from a database. A client is coupled to a server which is coupled to the database. The client first initiates a session with the server and transmits query criteria to the server which specifies search criteria and which requests particular data rows to be returned.

Each data row in the database is associated with a unique primary key which uniquely identifies a particular row.

A pre-load cursor in the server then initiates a session with the database and queries the database to retrieve a copy of the primary key for each row which meets the criteria specified in the query criteria. A result set is then created which is pointed to by the pre-load cursor. This result set is an ordered list of the primary keys for all of the data rows meeting the criteria. The pre-load cursor then selects primary keys for the number of data rows originally requested in the query criteria. The pre-load cursor then queries the database a second time, this time using these primary keys to locate the rows associated with these primary keys. The pre-load cursor then returns the ordered list of all primary keys and copies of only the requested number of rows to the client. The session between the server and the database is then ended.

Thereafter, the client may request additional copies of a particular number of those data rows which meet the originally specified criteria by issuing queries using only the primary keys for the requested rows. Subsequent queries of the database are conducted by the pre-load cursor using only these primary keys. Copies of only the particular number of data rows are then returned to the requesting client.

Figure 3:
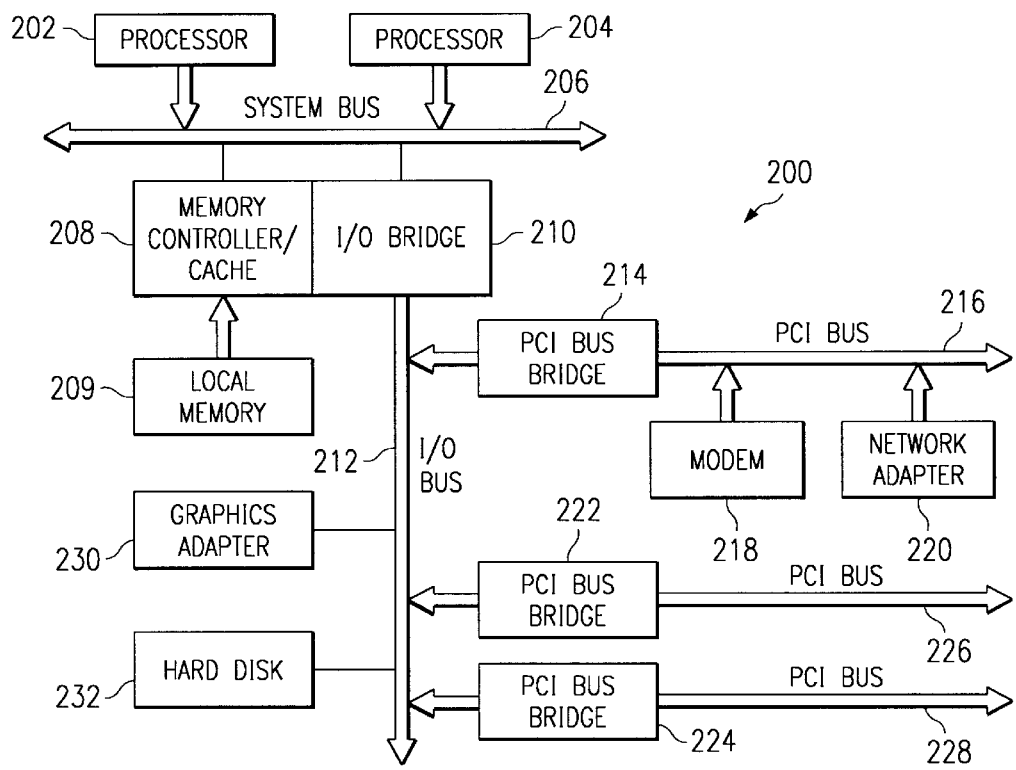
FIG. 3 is an exemplary diagram of a client according to the present invention.

With reference now to the figures, and in particular with reference to FIG. 3, a block diagram of a data processing system which may be implemented as a server is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other network computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
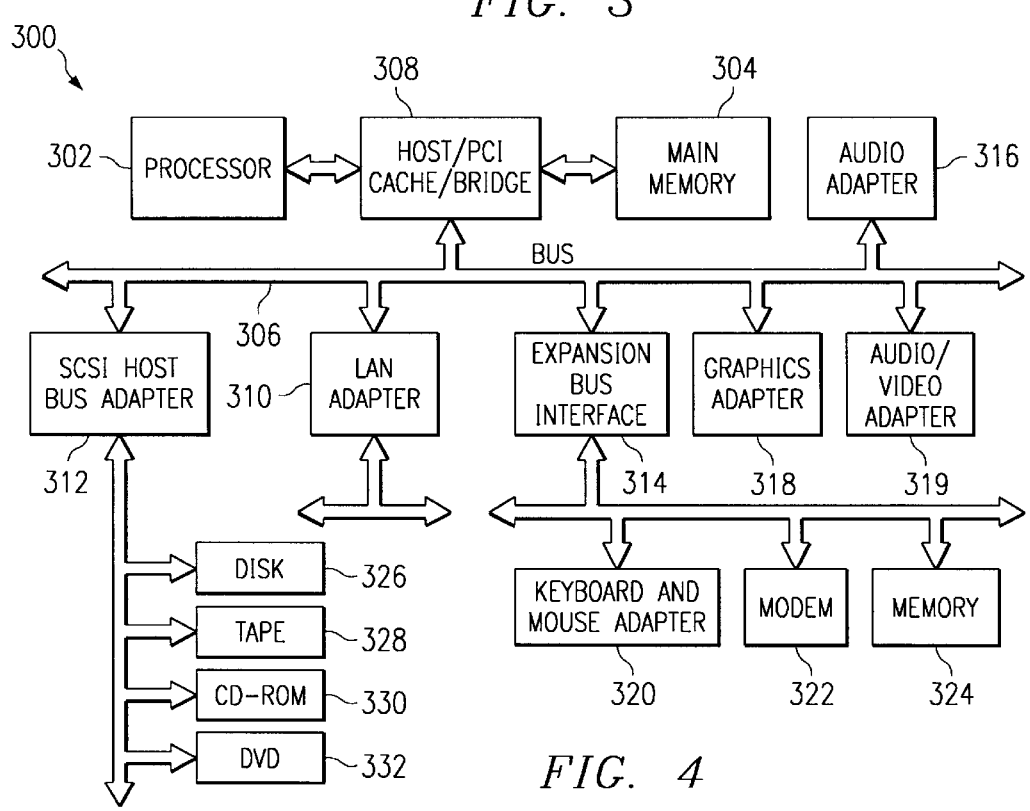
FIG. 4 is an exemplary block diagram of a server according to the present invention.

With reference now to FIG. 4 a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 4. The operating system may be a commercially available operating system, such as Windows 2000, which is available from Microsoft Corporation. Instructions for the operating system, and applications or programs are located on storage devices, such as hard disk drive 326, and may be loaded into main memory 304 for execution by processor 302.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 300 also may be a notebook computer or hand held computer in addition to taking the form of a PDA. Data processing system 300 also may be a kiosk or a Web appliance.

Figure 1:
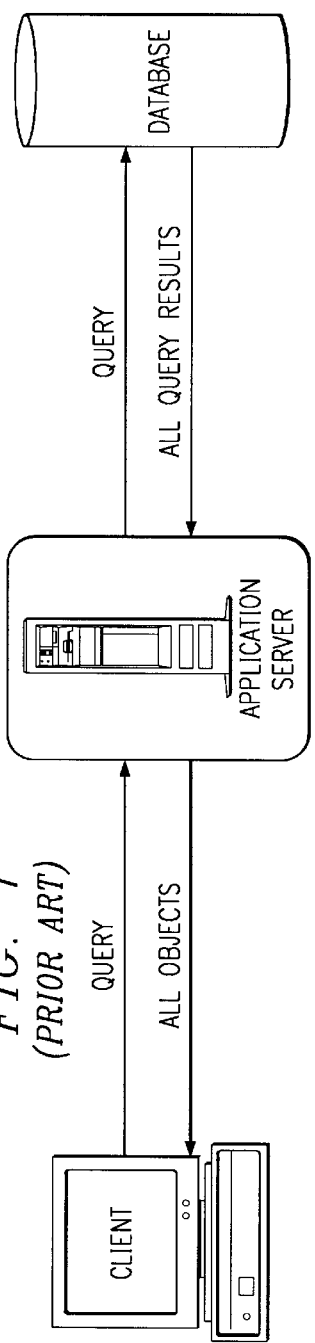
FIG. 1 is a block diagram of a data processing system executing a cursor method for returning data rows in a stateless application server in accordance with the prior art.
Figure 2:
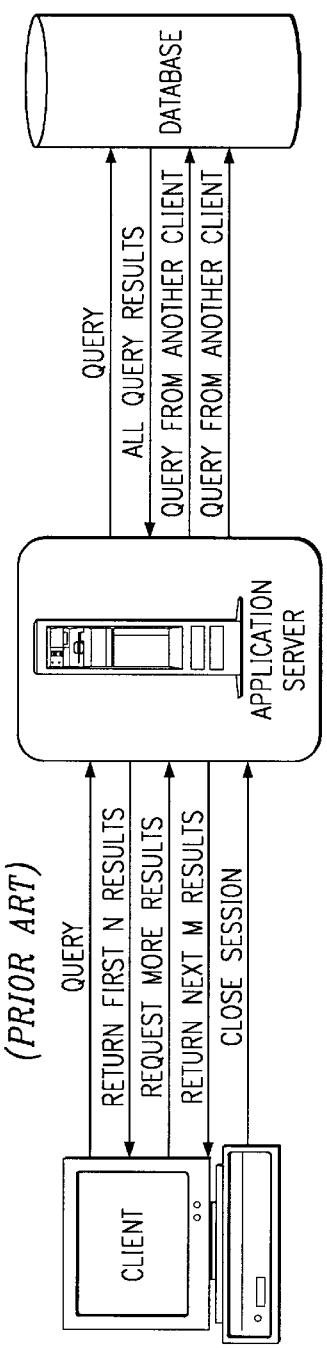
FIG. 2 is a block diagram of a data processing system executing a cursor method for returning data rows in a stateful application server in accordance with the prior art.
Figure 5:
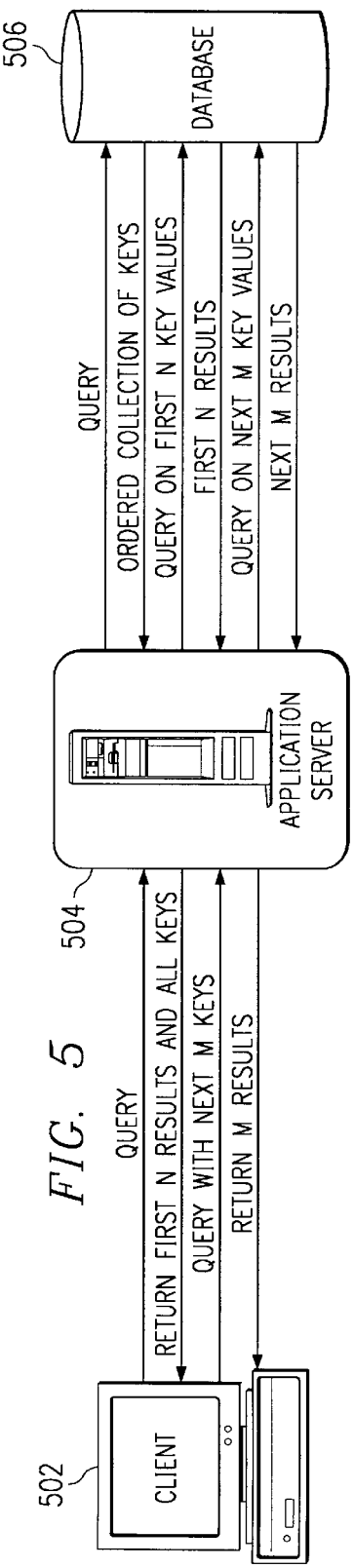
FIG. 5 is a block diagram of a data processing system executing a pre-load cursor method for returning data in a stateless application server in accordance with the present invention.

FIG. 5 depicts a data processing system executing a pre-load cursor method for returning data in a stateless application server in accordance with the present invention. The data processing system includes a client 502, a stateful application server 504, and a database 506. Client 502 first initiates a session with server 504 and then transmits the query criteria to application server 504 requesting a particular number of data rows which meet certain criteria specified in the query criteria. When application server 504 receives the query criteria, a pre-load cursor is created in application server 504 which then initiates a session with database 506. The pre-load cursor in the application server 504 queries database 506. The pre-load cursor retrieves an ordered list of copies of the primary key of each data row which meets the criteria specified in the query criteria. The primary keys are listed in the result set according to the order of the data rows identified by the primary keys. For example, the first ten primary keys in the ordered list identify the first ten data rows which were found which meet the specified criteria. Therefore, in response to the first query of database 506, only primary keys are returned to server 504.

The pre-load cursor then creates another query using selected primary keys. The query criteria received from client 502 did not request all data rows. Only a particular number of data rows were requested. Therefore, primary keys are selected which identify only the requested particular number of data rows. The pre-load cursor then retrieves copies of only those data rows from database 506 which are identified by the selected primary keys. Server 504 then returns to client 502 copies of the requested number of data rows and copies of the primary key of all data rows which meet the search criteria.

This session between application server 504 and database 506 is then ended. Even though the session between server 504 and database 506 has ended, the session between client 502 and server 504 is still open. Database 506 may then be accessed by other systems.

Thereafter, client 502 may transmit another query for additional data rows which meet the same criteria. However, in this case, the query will not include the search criteria. The query will include only the primary keys for the requested data. The pre-load cursor then initiates another session with database 506 to retrieve copies of the data rows identified by the primary keys included in this query. This session between server 504 and database 506 is then ended.

At any time after receiving a response from the server, the client 502 may end its session with server 504.

In the pre-load cursor implementation which uses a stateless server, data is obtained from the database more efficiently than in the prior art stateless server implementation. Unlike the prior art implementation which returns copies of all data rows without regard to the number actually requested, the pre-load cursor implementation returns copies of only the number of data rows actually requested. In addition, using the pre-load cursor, database 506 is available between the client requests because multiple sessions are initiated between database 506 and application server 504, one for each client request. Between these sessions, database 506 is available. Finally, another advantage of the pre-load cursor arises because all subsequent searches of the database use primary keys. Searching a database using primary keys is much faster than searching a database using search criteria.

Figure 6:
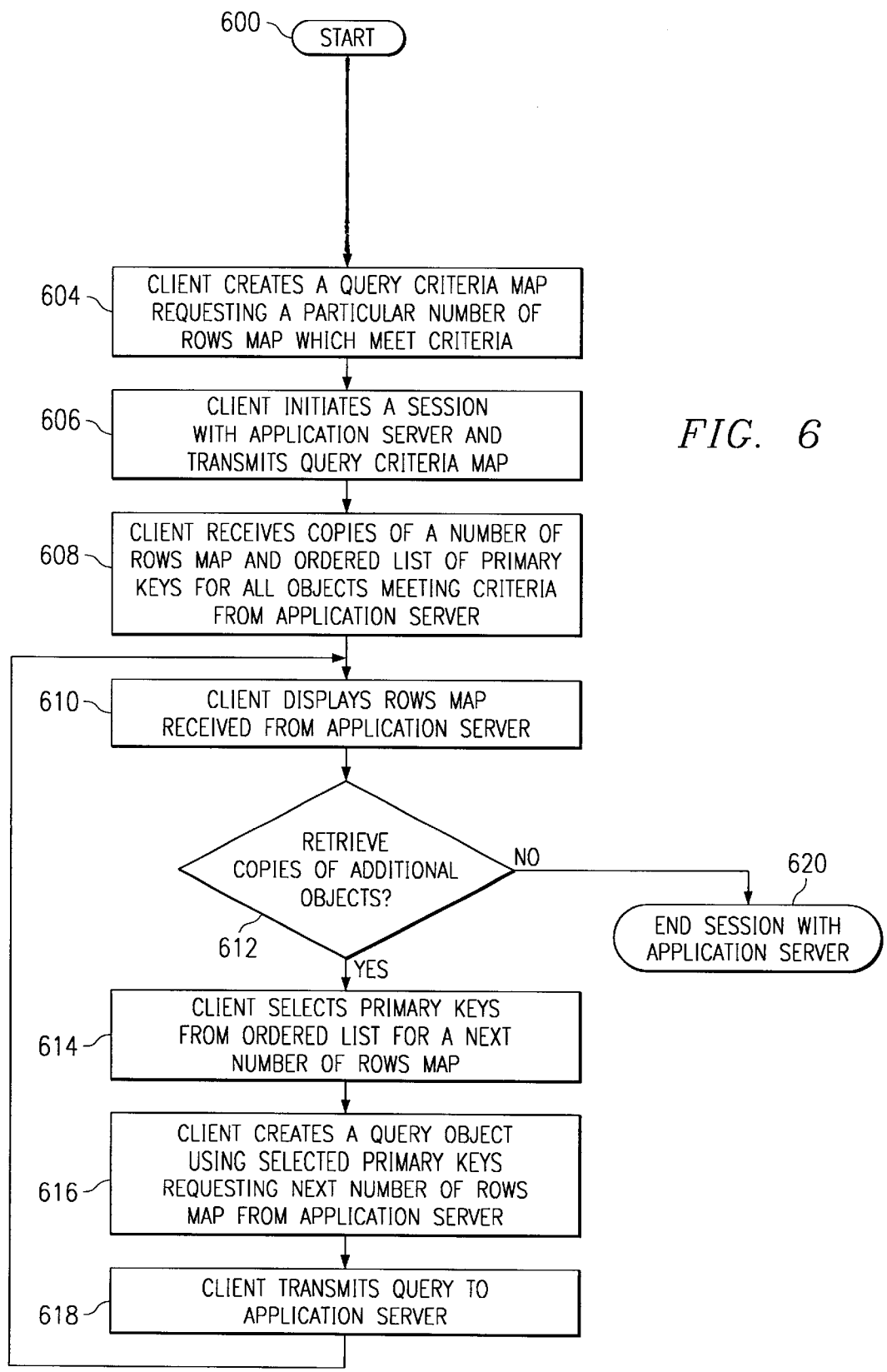
FIG. 6 illustrates a high level flow chart which depicts a client computer system requesting, receiving, and displaying data rows in accordance with the present invention.

FIG. 6 illustrates a high level flow chart which depicts a client requesting, receiving, and displaying data rows in accordance with the present invention. The process starts as depicted by block 600. When a query is to be executed the process passes to block 604 which depicts the client creating the query criteria which includes the number of data rows to be returned and other search criteria specified by the client. Next, block 606 illustrates the client initiating a session with the application server and transmitting the query criteria to the application server.

The process then passes to block 608 which depicts the client receiving from the application server copies of a number of rows and an ordered list of primary keys for all rows which meet the criteria specified within the query criteria. Next, block 610 illustrates the client displaying the copies of the data rows received from the application server. Block 612, then, depicts a determination of whether or not copies of additional rows are to be retrieved. If a determination is made that no copies of additional rows are to be retrieved, the process passes to block 620 which illustrates the client ending this session with the application server.

Referring again to block 612, if a determination is made that copies of additional rows are to be retrieved, the process passes to block 614 which depicts the client selecting primary keys from the ordered list for a next number of rows. Thereafter, block 616 illustrates the client creating query criteria that simply contains the primary keys selected from the list. The query criteria requests copies of the next number of rows from the application server using only those objects' primary keys. Next, block 618 depicts the client transmitting the query criteria to the application server. The process then passes back to block 610.

Figure 7:
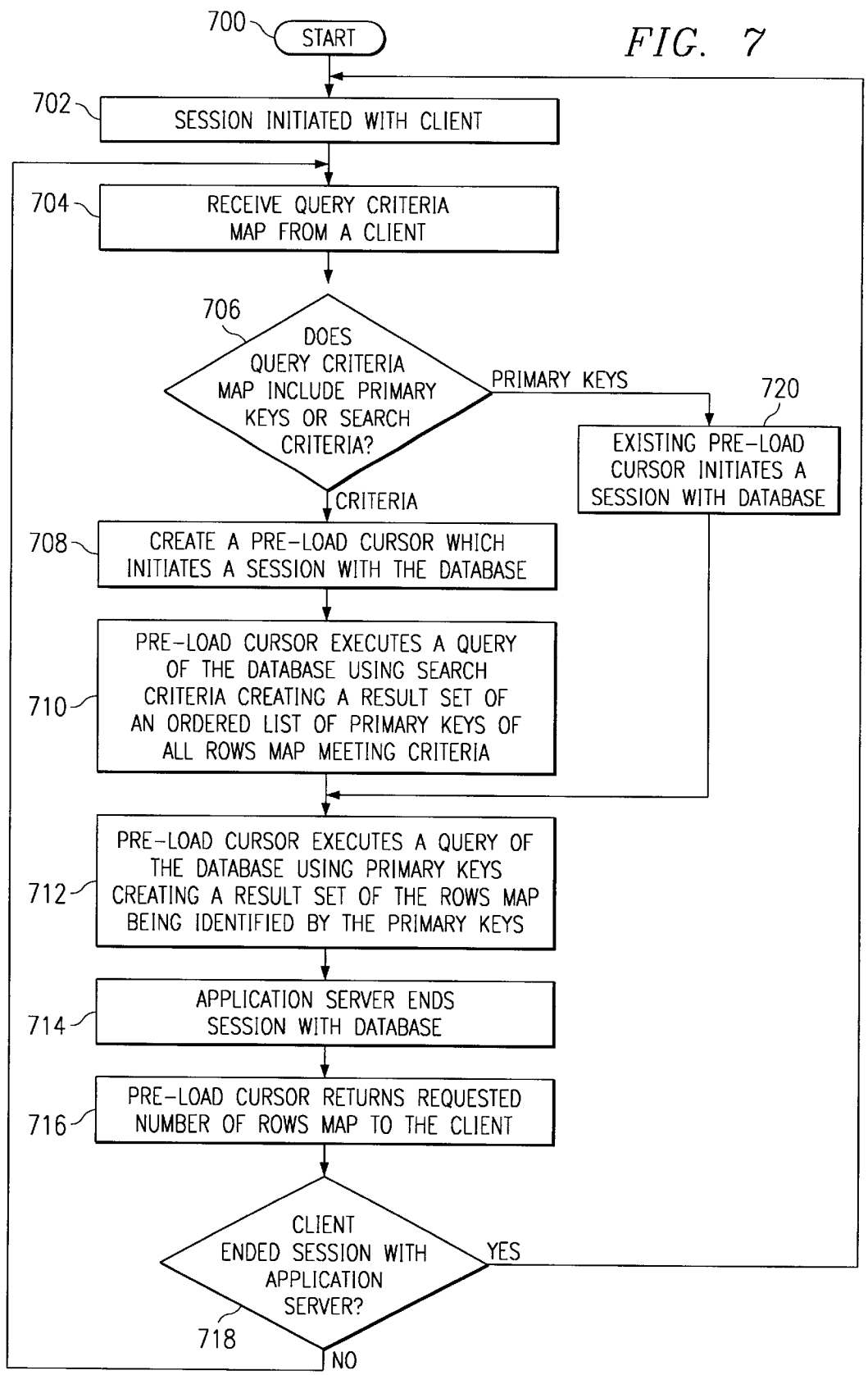
FIG. 7 depicts a high level flow chart which illustrates a stateless application server utilizing a pre-load cursor to obtain copies of requested data rows in accordance with the method and system of the present invention.

FIG. 7 depicts a high level flow chart which illustrates a stateless application server utilizing a pre-load cursor to obtain copies of requested data rows in accordance with the method and system of the present invention. The process starts as depicted by block 700 and thereafter passes to block 702 which illustrates a session being initiated between the application server and the client. The process then passes to block 704 which depicts the application server receiving the query criteria from a client. The query criteria specifies the number of rows to retrieve and the search criteria to use to select rows. Next, block 706 depicts a determination of whether or not the query criteria includes primary keys or search criteria. If a determination is made that the query criteria includes search criteria, the process passes to block 708 which illustrates the application server creating a pre-load cursor which initiates a session with the database. The process then passes to block 710 which depicts the pre-load cursor executing a query of the database using the search criteria resulting in the creation of a result set of an ordered list of primary keys of all data rows which meet the criteria. The process then passes to block 712 which illustrates the pre-load cursor executing a query of the database using the primary keys and creating a result set which includes the rows identified by the primary keys. Next, block 714 illustrates the server ending the session with the database.

The process then passes to block 716 which illustrates the pre-load cursor returning the requested number of data rows to the client. Thereafter, block 718 depicts a determination of whether or not the client ended the session with the application server. If a determination is made that the client has not yet ended its session with the server, the process passes back to block 704. Referring again to block 718, if a determination is made that the client has ended its session with the server, the process passes back to block 702.

Referring again to block 706, if a determination is made that the query criteria includes primary keys instead of search criteria, the process passes to block 720 which illustrates the existing pre-load cursor initiating another session with the database. The process then passes to block 712.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a database for efficiently retrieving copies of data rows from said database, said method comprising the steps of:

receiving query criteria, from a query source, which specifies search criteria describing a plurality of data rows and which requests a particular number of said plurality of data rows to return, each of said plurality of data rows being associated with a unique primary key which uniquely identifies said each of said plurality of data rows;

returning said primary key for each of said plurality of data rows from said database in response to said query criteria, thereby forming a list of returned primary keys;

receiving a query for rows corresponding to selected Primary keys from the list of returned primary keys, wherein a number of the selected primary keys is equal to or less than the particular number of said plurality of data rows to return; and returning copies of data rows, corresponding to the selected primary keys, to a query source.

2. The method according to claim 1, wherein said data processing system includes a client and a server coupled together, further comprising the steps of:

in response to said receipt of said query criteria by said server, initiating a session between said database and said server;

retrieving said primary key for each of said plurality of data rows front said database utilizing said server;

retrieving said copies of only said particular number of said plurality of data rows from said database utilizing said server; and ending said session between said database and said server.

3. The method according to claim 2, further comprising the steps of:

returning said primary key for each of said plurality of data rows to said client utilizing said server; and returning said copies of only said particular number of said plurality of data rows to said client utilizing said server.

4. The method according to claim 2, wherein the step of retrieving said copies of only said particular number of said plurality of data rows further comprises the steps of:

selecting said particular number of said primary keys which uniquely identify a plurality of said plurality of data rows; and retrieving said copies of said plurality of said plurality of data rows utilizing said primary keys.

5. The method according to claim 2, further comprising to steps of:

receiving a second query criteria which specifies one or more of said primary keys;

in response to a receipt of said second query criteria, initiating a session between said database and said server;

retrieving copies of one or more of said plurality of data rows from said database utilizing said one or more of said primary keys, wherein said one or mare of said primary keys uniquely identifies said one or more of said plurality of data rows; and ending said session between said database and said server.

6. The method according to claim 5, further comprising the steps of:

initiating a session between said client and said server;

transmitting said query from said client to said server;

receiving, by said client, said primary key for each of said plurality of data rows from said server;

receiving, by said client, said copies of only said particular number of said plurality of data rows from said server;

transmitting said second query from said client to said server;

receiving, by said client, said copies of said one or more of said plurality of data rows which are uniquely identified by said one or more of said primary keys; and ending said session between said client and said server.

7. The method according to claim 6, further comprising the steps of:

displaying, utilizing said client, said copies of said particular number of said plurality of data rows; and displaying, utilizing said client, said copies of said one or more of said plurality of data rows.

8. A data processing system including a database for efficiently retrieving copies of data rows from said database, comprising:

means for receiving query criteria, from a query source, which specifics search criteria describing a plurality of data rows and which requests a particular number of said plurality of data rows to return, each of said plurality of data rows being associated with a unique primary key which uniquely identifies said each of said plurality of data rows;

a pre-load cursor for returning said primary key for each of said plurality of data rows from said database in response to said query criteria, thereby forming a list of returned primary keys;

means for receiving a query for rows corresponding to selected primary keys from the list of returned primary keys, wherein a number of the selected primary keys is equal to or less than the particular number of said plurality of data rows to return; and a pre-load cursor for returning copies of data rows, corresponding to the selected primary keys, to a query source.

9. The system according to claim 8, wherein said data processing system includes a client and a server coupled together, further comprising:

in response to said receipt of said query criteria by said server, a session initiated between said database and said server;

said pre-load cursor for retrieving said primary key for each of said plurality of data rows from said database utilizing said server;

said pry-load cursor for retrieving said copies of only said particular number of said plurality of data rows from said database utilizing said server; and said server for ending said session between said database and said server.

10. The system according to claim 9, further comprising:

said primary key being returned for each of said plurality of data rows to said client utilizing said server; and said copies of only said particular number of said plurality of data rows being returned to said client utilizing said server.

11. The system according to claim 9, further comprising:

said pre-load cursor for selecting said particular number of said primary keys which uniquely identify a plurality of said plurality of data rows; and said pre-load cursor for retrieving said copies of said plurality of said plurality of data rows utilizing said primary keys.

12. The system according to claim 9, further comprising:

a second set of query criteria which specifies one or more of said primary keys;

in response to a receipt of said second query criteria, a session initiated between said database and said server;

said pre-load cursor for retrieving copies of one or more of said plurality of data rows from said database utilizing said one or more of said primary keys, wherein said one or more of said primary keys uniquely identifies said one or more of said plurality of data rows; and said server for ending said session between said database and said server.

13. The system according to claim 12, further comprising:

a session initiated between said client and said server;

said client for transmitting said query from said client to said server;

said client for receiving said primary key for each of said plurality of data rows from said server;

said client for receiving said copies of only said particular number of said plurality of data rows from said server;

said client for transmitting said second query criteria to said server;

said client for receiving said copies of said one or more of said plurality of data rows which are uniquely identified by said one or more of said primary keys; and said client for ending said session between said client and said server.

14. The system according to claim 13, further comprising:

said client for displaying said copies of said particular number of said plurality of data rows; and said client for displaying said copies of said one or more of said plurality of data rows.

* * * * *

UNITED STATES PATENT AND TRADEMARK OFFICE
CERTIFICATE OF CORRECTION

| | |
|---|---|
| PATENT NO. | : 6,735,582 B2 |
| APPLICATION NO. | : 09/738238 |
| DATED | : May 11, 2004 |
| INVENTOR(S) | : Fritsche et al. |

It is certified that error appears in the above-identified patent and that said Letters Patent is hereby corrected as shown below:

Col. 8, line 44: before "keys from the list" delete "Primary" and insert --primary--.

Col. 8, line 57: after "rows" delete "front" and insert --from--.

Col. 9, line 21: after "one or" delete "mare" and insert --more--.

Col. 10, line 10: before "cursor" delete "pry-load" and insert --pre-load--.

Signed and Sealed this

First Day of May, 2007

JON W. DUDAS
*Director of the United States Patent and Trademark Office*